P. P. ALTLAND.
RUNNER.
APPLICATION FILED APR. 14, 1919.
1,345,307.
Patented June 29, 1920.
2 SHEETS—SHEET 1.
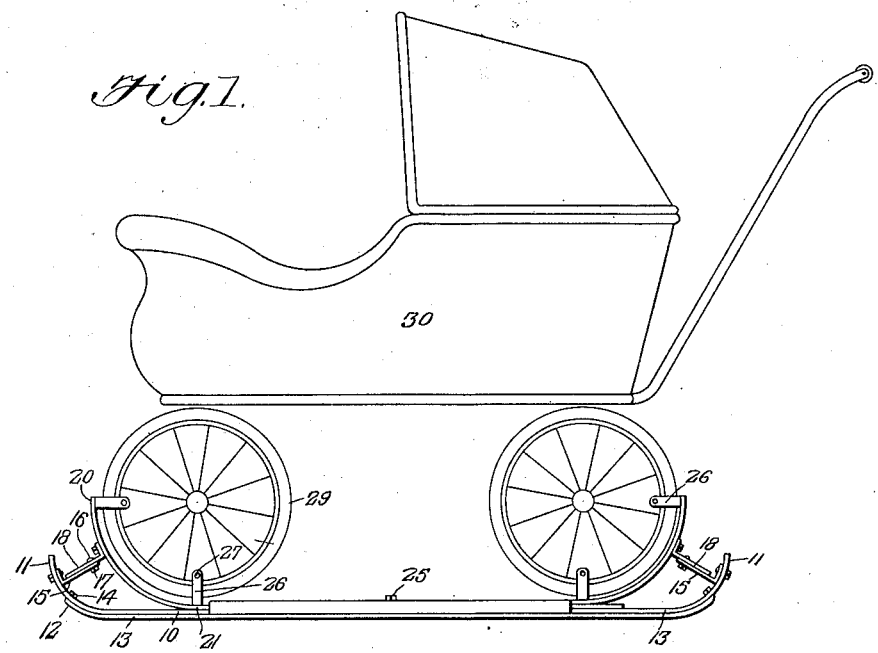
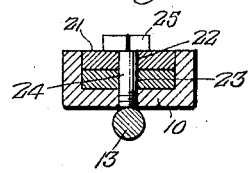
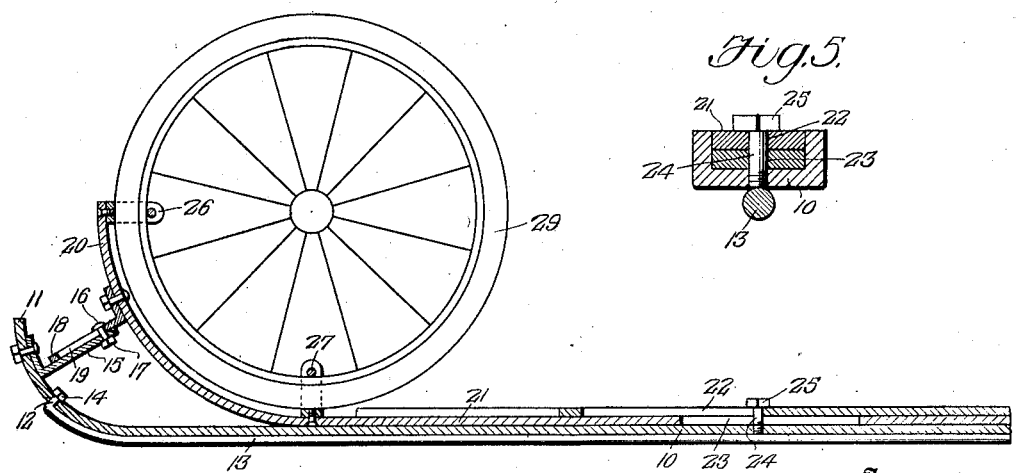
Witnesses
J. H. Crawford
Inventor
P. P. Altland,
By Victor J. Evans
Attorney

P. P. ALTLAND.
RUNNER.
APPLICATION FILED APR. 14, 1919.

1,345,307.

Patented June 29, 1920.
2 SHEETS—SHEET 2.

Witnesses
J H Crawford

Inventor
P. P. Altland,
By Victor J. Evans
Attorney

UNITED STATES PATENT OFFICE.

PAUL P. ALTLAND, OF ROCHESTER, NEW HAMPSHIRE.

RUNNER.

1,345,307.  Specification of Letters Patent. Patented June 29, 1920.

Application filed April 14, 1919. Serial No. 289,909.

*To all whom it may concern:*

Be it known that I, PAUL P. ALTLAND, a citizen of the United States, residing at Rochester, in the county of Strafford and State of New Hampshire, have invented new and useful Improvements in Runners, of which the following is a specification.

This invention has reference to means for converting a wheeled vehicle into a sled.

The object of the invention is to produce a runner which may be easily and quickly attached to a vehicle wheel so that the vehicle may be effectively propelled over snow or icy ground.

A further object of the invention is to produce a runner which shall be adjustable whereby the same may be secured upon wheels of varying diameters.

A still further object of the invention is to produce a runner for vehicle wheels having means associated therewith which will prevent skidding or lateral movement thereof when traveling over slippery surfaces.

Other objects and advantages will appear as the nature of the invention is better understood, reference being had to the accompanying drawings, in which:

Figure 1 is a view illustrating the application of the improvement to a baby carriage.

Fig. 4 is a central vertical longitudinal sectional view through the improvement.

Fig. 5 is a transverse sectional view on the line 5—5 of Fig. 3.

Figure 2:
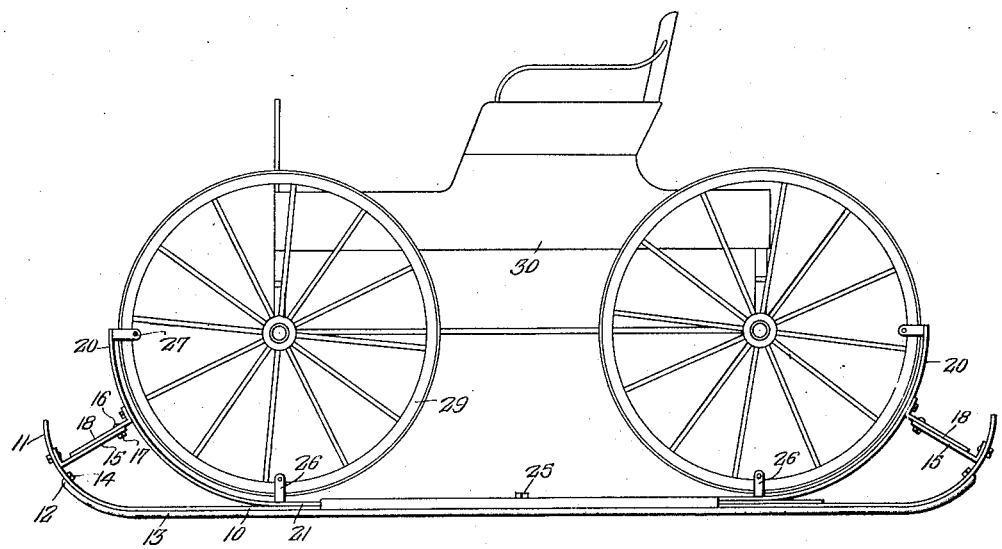
Fig. 2 is a view illustrating the application of the improvement to an ordinary horse drawn carriage.
Figure 3:
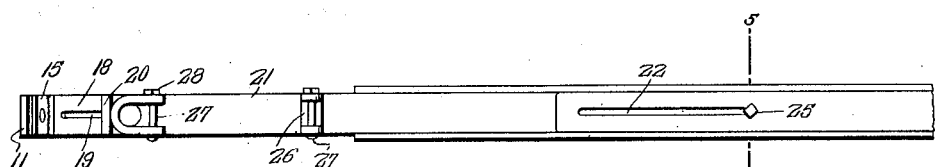
Fig. 3 is a top plan view of the device, in part.
Figure 6:
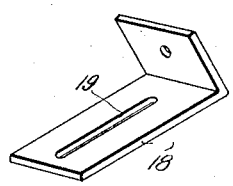
Fig. 6 shows a bracket employed in the device.

While in the drawings I have illustrated the device in applied position upon a baby carriage and a horse drawn vehicle, it is here to be stated that my improved runner may be readily applied to the front wheel of a bicycle or motorcycle, to the front wheels of automobiles, and as a matter of fact to any other class of wheeled road vehicles.

The improvement contemplates the employment of a metallic body member or runner proper, which is designated by the numeral 10. The body member or runner proper is in the nature of a flat metal strip, preferably constructed of a bar of steel and has its ends rounded upwardly and outwardly as indicated by the numeral 11. To the rounded ends 11 of the body 10 are secured the offset ends 12 of a metal rod 13. The rod is round in cross section and the ends thereof pass through openings in the referred to rounded ends of the body, the said ends of the rod being preferably threaded and being engaged by nuts 14. The rod, in addition to providing a wear member is primarily designed to prevent side movement or skidding of the runner when the vehicle to which it is attached travels over slippery surfaces.

On the inner faces of the rounded ends 11 of the body 10 are preferably removably secured inwardly extending angularly disposed brackets 15, each of the said brackets having at its outer end an adjustable element preferably in the nature of a headed threaded member 16 engaged by a nut 17. The brackets 15 are lapped by similar brackets or straps 18, the same having elongated slots or openings 19 through which the shanks of the headed members 16 pass. By adjusting the headed members the brackets 18 may be adjusted longitudinally with respect to the brackets 15. The brackets 18 are secured to the round ends 20 of strap members 21. These straps have their inner portions straight and arranged one over the other, and both of the straps are arranged over the body or runner proper. The straps are provided with elongated slots or openings 22 and 23 respectively receiving therethrough the headed shank 24 of a headed member 25, the headed member being of a size to rest over the outer strap to the opposite sides of the slot therein. The threaded shank of the member engages in the threaded orifice in the center of the body or runner proper.

On each of the straps is a yoke-shaped clamp 26. If desired, these clamps may be of spring material, and passing through registering openings in the arms thereof are the shanks of headed members 27, the said threaded shanks being engaged by nuts 28. The members 27 are removed when the device is to be applied on the rim 29 of a vehicle 30, and are thereafter received in the openings of the side members or yokes of the clamps, and the nuts are then adjusted on the said members. In this manner it will be noted that the runner may be easily and quickly applied to a vehicle wheel. It will be further noted that the device being adjustable may be arranged upon wheels of different circumferences and diameters. When the device is positioned upon a wheel it firmly engages therewith so the danger of accidental removal is entirely overcome. The rod member, as previously stated, prevents the lateral movement of the wheel upon which the runner is attached, regardless of the slipperiness of the surface over which the vehicle travels. The device, as also previously stated, may be attached to wheels of any class of vehicles, and it is thought, from the foregoing description, when taken in connection with the drawings, the simplicity of the construction and the advantages thereof will be apparent without further detailed description.

Having thus described the invention, what is claimed as new, is:—

1. A runner attachment for vehicle wheels, comprising a runner proper having round ends, brackets on said ends, straps lapping each other and overlying the runner and adjustably secured thereto, bracket members on said straps co-acting with the brackets of the runner, means for adjustably securing said brackets, and means on the straps for securing the same on the wheel of the vehicle.

2. A runner having round ends, lapping straps arranged on the runner, means for retaining said straps adjusted, said straps having rounded ends, adjustable brackets between the rounded ends of the straps and the rounded ends of the runner, and yoke-shaped clamps carried by the said rounded ends of the straps.

In testimony whereof I affix my signature.

PAUL P. ALTLAND.